Figure 1:
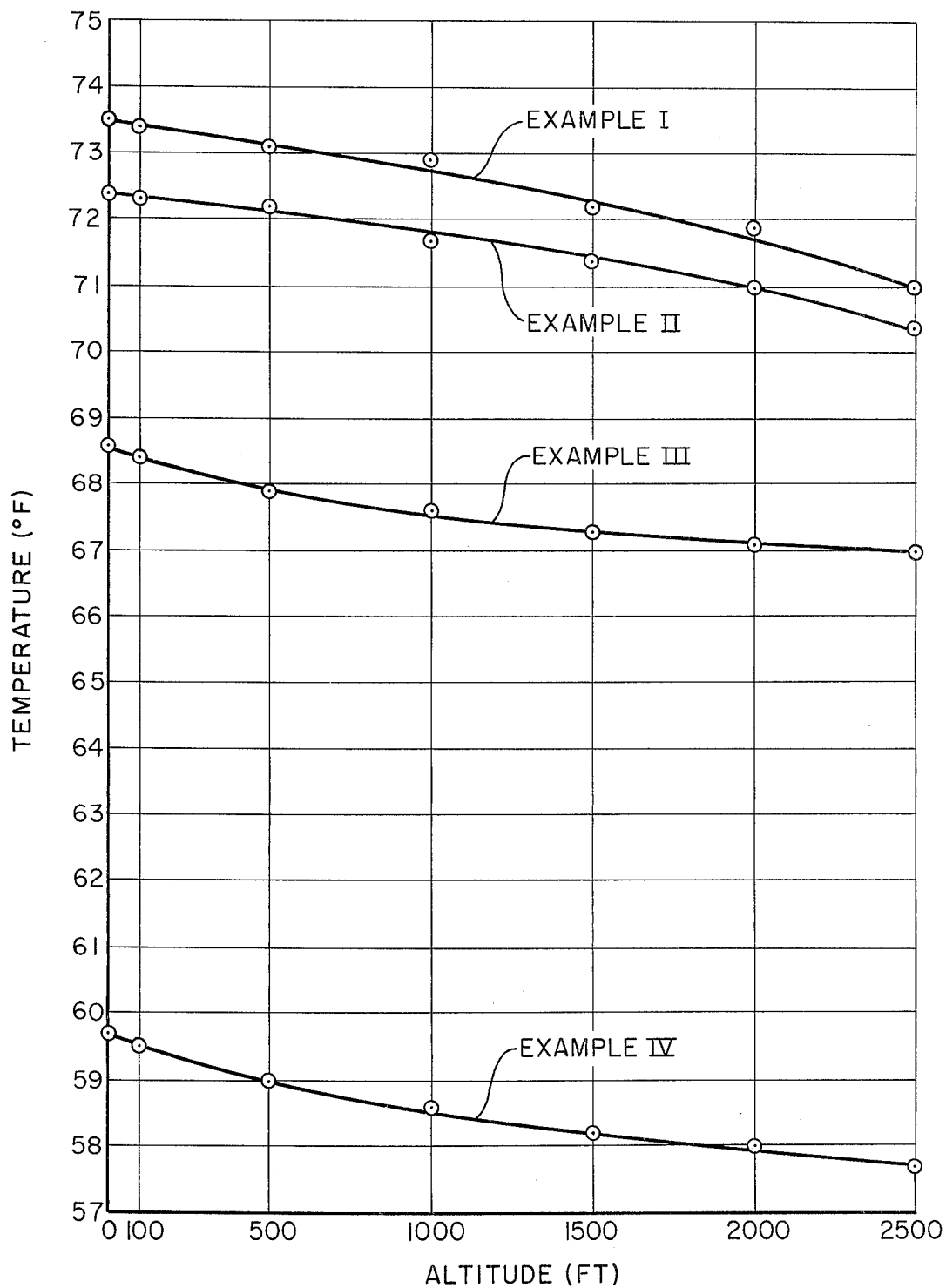

United States Patent [19]
Schott et al.

[11] 3,970,848
[45] July 20, 1976

[54] PROFILE TECHNIQUE FOR CALIBRATING INFRARED THERMAL IMAGING SYSTEMS

[75] Inventors: John R. Schott, Buffalo; Timothy W. Gallagher, North Tonawanda, both of N.Y.

[73] Assignee: Calspan Corporation, Buffalo, N.Y.

[22] Filed: Aug. 22, 1975

[21] Appl. No.: 606,904

[52] U.S. Cl. .............................. 250/252; 250/340
[51] Int. Cl.² ........................................ G01D 18/00
[58] Field of Search ........... 250/338, 339, 340, 342, 250/252; 73/355 R

[56] References Cited
UNITED STATES PATENTS

| | | |
|---|---|---|
| 3,056,958 | 10/1962 | Anderson.................... 250/338 X |
| 3,373,281 | 3/1968 | McAlister..................... 250/340 X |
| 3,448,267 | 6/1969 | Blythe et al................... 250/338 X |

*Primary Examiner*—Davis L. Willis
*Attorney, Agent, or Firm*—David J. Zobkiw

[57] ABSTRACT

The present invention discloses an analysis procedure which permits the calibration of airborne thermal infrared systems to absolute ground temperature and the removal of variations due to slant angle without the need for ground measurements. Absolute ground temperature are extrapolated from data taken at a plurality of altitudes over a selected reference point.

9 Claims, 1 Drawing Figure

PROFILE TECHNIQUE FOR CALIBRATING INFRARED THERMAL IMAGING SYSTEMS

The remote sensing of terrain surface temperatures using thermal infrared detection systems has become an aerial survey technique required for the solutions to many planning and analysis problems facing environmental and general engineering scientists. One of the major problems in this field has been in correlating the remotely sensed signal level to an absolute ground temperature. The standard means of calibration is to relate temperature measurements made on the ground to data obtained in a simultaneous over flight, but the difficulties and expenses involved in obtaining reliable ground data are often limiting factors. The most accurate procedure for collecting ground data is to have a radiometer, with the same band pass as the sensor, in the field to measure precisely a ground temperature and to use survey instruments to triangulate the exact position of the temperature measurement. Measuring water surface temperatures from a boat, with field radiometer and triangulation equipment operating at the same time as the over flight, is even more difficult and expensive than from the land. There are additional problems such as avoiding the taking of temperature measurements of the upwelling water around a boat because the temperature measured in the upwelling water is much too local of an event to be properly resolved by an airborne system. The use of thermometers and thermistors only increases the problems because there is no assurance that a surface temperature is being measured with such instruments.

It is an object of this invention to provide a calibration method for airborne infrared thermal imaging systems which does not require the collecting of ground data.

It is a further object of this invention to provide a more accurate and reliable calibration method for infrared thermal imaging systems.

It is an additional object of this invention to provide a method for removing atmospheric effects on both fixed vertical looking instruments and scanning systems. These objects, and others as will become apparent hereinafter, are accomplished by the present invention.

According to the teachings of the present invention, a radiometer which has been calibrated for the emissivity of the terrain surface of interest is mounted in an aircraft so that its field of view is defined relative to the imaging system installed in the aircraft. Since most interest is currently directed to surface water temperatures due to the enforcement of thermal pollution standards established by the Environmental Protection Agency, the radiometer will typically be calibrated for water. It is most convenient to bore sight the radiometer with the center line of the thermal infrared scanner used for imaging. Thus, the data recorded from the radiometer during a flight corresponds to the imaged information along the center line of the scanner image. The temperature recorded by the radiometer at operating altitude, is an apparent rather than an absolute temperature and must, therefore, be corrected for atmospheric effects according to the formula $$T_o = T_g + \Delta T$$

where $T_o$ is the observed temperature $T_g$ is the actual ground temperature $\Delta T$ is the apparent temperature change caused by atmospheric conditions If the aircraft could be flown over the same point of the terrain at operating altitude and at ground level or 0 altitude, then $T_o$ and $T_g$ are measured directly and $\Delta T = T_o - T_g$ would be known for all data collected at that altitude. With $\Delta T$ known, then the ground temperatures of all points observed at the operating altitude are given by $$T_g = T_o - \Delta T$$

Because of terrain restrictions on flight altitudes, 0 altitude measurements cannot be obtained from aircraft. This problem of obtaining 0 altitude measurements is overcome by the technique of the present invention wherein radiometer and thermal imagery data are collected at a minimum of 4 altitudes over a given target. These altitudes range from flight altitude to the lowest altitude permitted by terrain restrictions. The temperatures recorded at each altitude are plotted against the altitude for the same ground point. The data is then readily extrapolated to 0 altitude to obtain the actual ground temperature, $T_g$.

The FIGURE is a plot of several sets of test data extrapolated to 0 altitude to obtain the actual ground temperature, $T_g$.

In practice, it is difficult to overfly precisely the same point using only a radiometer because of the small look angle of the radiometer, typically on the order of 2°. Operating the boresighted radiometer with a thermal imaging system provides a simple means of identifying the area the radiometer is viewing and the same area, or other areas of equal temperature as the initial area, on subsequent flights over the target. It is, therefore, possible to use the radiometer signal for points, other than the original target, which have been identified by the imaging system as having the same temperature as the target.

To complete the system calibration, it is necessary to calibrate the imaging system to ground temperature using the radiometer calibration. In an imaging system, the signal level at each point in the imaged area is a function of the ground temperature at that point. For a linear system, two ground points identified by both the imaging system and the radiometer are sufficient to calibrate the system. The radiometer is calibrated so that it views points of known ground temperature and these points are also viewed by the scanner. The two points are known to have temperatures $T_1$ and $T_2$ from the radiometer records and signal levels $S_1$ and $S_2$ from the scanner record. Therefore, the relationship between S and T can be established. For non-linear systems, more points may be needed to fully define the system variables, but the approach is the same.

Thus, the atmospheric correction for the vertical path length is defined. The infrared scanner system typically scans an angle ± 60° from the nadir, thus making the path length through the atmosphere up to two times the flight altitude. Since the profile method samples the atmospheric attenuation in incremental steps, it is possible to remove the increased atmospheric attenuation as follows:

$$X = H/\cos\theta$$

$$\Delta X_i = \Delta H_i/\cos\theta$$

$$\alpha = \Delta T/\Delta H$$

$$\Delta T_n = \sum_{i=1}^{n} \Delta X_i \alpha_i$$

where
$X$ = Path length at angle $\theta$
$H$ = Altitude
$\theta$ = Scan angle
$\alpha$ = Atmospheric attenuation
$i$ = Altitude increment
$T$ = Temperature
$n$ = Number of increment steps available
$T_n$ = Total change in apparent temperature In this way, the increase in attenuation due to slant angle can be calculated for each altitude increment in the profile and associated changes in observed temperature can be calculated for each interval and summed to give the total change.

OPERATION

In the practice of this invention, an airplane is equipped with a thermal imaging system such as a model LN-3 scanner manufactured by Bendix Aerospace Systems Division of Ann Arbor, Michigan and with a radiometer such as a model PRT 5 radiometer manufactured by Barnes Engineering Co. of Stamford, Connecticut. The scanner is capable of sensing a 120° path and indicating the apparent surface radiometric temperature of everything in the sensed path. The radiometer, which has a 2° field of view, is boresighted to the scanner to provide a simple means of identifying the area the radiometer is viewing as well as identifying other areas of equal temperature sensed by the scanner. Since water is the major area of interest at the present time, the calibration site will be an area of water with a uniform temperature. Because a plot of the temperature recorded at each altitude against the altitude will be a curve whose slope is influenced by atmospheric effects such as the presence of water vapor, ozone, $NO_2$, $SO_2$, etc. in the atmosphere, it is desirable to obtain a plurality of points to plot. In practice, with a water calibration site, the above described equipment and a flight altitude of 2,500 feet, it is practical to fly a profile for the chosen site by making six level flights overflying the chosen site at altitudes of 100, 500, 1,000, 1,500, 2,000 and 2,500 feet within a 10 – 15 minute time span. The data obtained is plotted and extrapolated to 0 altitude to determine the ground temperature, $T_g$. Additionally, a polynomial regression can be fit to the plotted points and extrapolated to 0 altitude. Land based instruments have confirmed the accuracy of this technique and the temperature correction, $\Delta T$, obtained is valid for use for several hours, absent a change in the condition of the atmospheric path. Once an atmospheric correction is obtained for an area, in the case of a water site, it can be extended for several miles where atmospheric conditions are the same.

EXAMPLE 1

Profile data obtained at Bowline Point, N.Y. on Sept. 19, 1974 between 13:32 and 13:43 EDT:

| Altitude (Ft.) | Temperature Observed |
|---|---|
| 2,500 | 71.0°F |
| 2,000 | 71.9° |
| 1,500 | 72.2° |
| 1,000 | 72.9° |
| 500 | 73.1° |
| 100 | 73.4° |
| 0 (Extrapolated) | 73.5° |
| $\Delta T$ at 2,500 ft. = 73.5° – 71° = 2.0°F | |

EXAMPLE II

Profile data obtained at Danskammer Point, N.Y. on Sept. 19, 1974 between 17:05 and 17:15 EDT:

| Altitude (Ft.) | Temperature Observed |
|---|---|
| 2,500 | 70.4°F |
| 2,000 | 71.0° |
| 1,500 | 71.4° |
| 1,000 | 71.7° |
| 500 | 72.2° |
| 100 | 72.3° |
| 0 (Extrapolated) | 72.4° |
| $\Delta T$ at 2,500 ft. = 72.4° – 70.4° = 2.0°F | |

EXAMPLE III

Profile data obtained at Bowline Point, N.Y. on Sept. 24, 1974 between 12:02 and 12:17 EDT:

| Altitude (Ft.) | Temperature Observed |
|---|---|
| 2,500 | 67.0°F |
| 2,000 | 67.1° |
| 1,500 | 67.3° |
| 1,000 | 67.6° |
| 500 | 67.9° |
| 100 | 68.4° |
| 0 (Extrapolated) | 68.6° |
| $\Delta T$ at 2,500 ft. = 68.6° – 67.0° = 1.6°F | |

EXAMPLE IV

Profile data obtained at Ninemile Point, N.Y. on Oct. 4, 1974 between 13:55 and 14:05 EDT:

| Altitude (Ft.) | Temperature Observed |
|---|---|
| 2,500 | 57.7°F |
| 2,000 | 58.0° |
| 1,500 | 58.2° |
| 1,000 | 58.6° |
| 500 | 59.0° |
| 100 | 59.5° |
| 0 (Extrapolated) | 59.7° |
| $\Delta T$ at 2,500 ft. = 59.7° – 57.7° = 2.0°F | |

Although the present invention has been described in terms of a water site, it is also applicable to a land site but this use is complicated by terrain which may limit the area of use of the correction due to localized atmospheric effects and restrictions due to the topography. Additionally, land sites require emissivity corrections. The present invention may also be practiced by using helicopter based instrumentation to obtain a continuous plotting of temperature and altitude as the helicopter descends from flight altitude to an altitude where propeller wash produces localized error-producing conditions. Since other changes will occur to those skilled in the art, it is therefore intended that the scope of the present invention is to be limited only by the scope of the appended claims.

We claim:

1. A method for calibrating airborne thermal imaging systems including the steps:
    selecting a stable reference point;
    making a plurality of flights over the selected reference point at altitudes ranging from ground level to flight altitude;
    observing and recording the flight altitude and observed temperature for the selected reference point on each flight;
    plotting the observed temperature for the reference point on each flight against flight altitude;
    extrapolating the plotted data to zero altitude to obtain the actual ground temperature; and
    subtracting the extrapolated ground temperature from the observed temperature at flight altitude to obtain the thermal imaging system correction.

2. The method of claim 1 wherein the step of making a plurality of flights includes making at least five overflights within a 15-minute time span.

3. The method of claim 1 further including the step of removing variations due to slant angle viewing.

4. A method for correcting atmospheric effects in airborne thermal imaging systems including the steps of:
    boresighting a radiometer to the thermal imaging system mounted in an aircraft;
    selecting a stable reference point;
    observing and recording the observed temperature at a plurality of altitudes over the selected reference point ranging from the lowest practical altitude to flight altitude;
    plotting the observed temperature for the reference point against the altitude;
    extrapolating the plotted data to zero altitude to obtain the actual ground temperature; and
    subtracting the extrapolated ground temperature from the observed temperature at flight altitude to obtain the atmospheric correction for the airborne thermal imaging systems.

5. The method of claim 4 wherein the radiometer is calibrated for the emissivity of the reference point.

6. The method of claim 4 further including the step of removing variations due to slant angle viewing.

7. A method for correcting atmospheric effects in airborne thermal imaging systems including the steps of:
    observing and recording the observed ground temperature at a plurality of altitudes including flight altitude;
    extrapolating the recorded data to determine the actual ground temperature;
    subtracting the extrapolated actual ground temperature from the observed ground temperature at flight altitude to obtain the thermal imaging system correction.

8. The method of claim 7 further including the step of identifying areas of equal temperature and performing the step of observing and recording over any of these areas of equal temperature.

9. The method of claim 7 further including the step of removing variations due to slant angle viewing.

* * * * *